United States Patent [19]

Dien et al.

[11] Patent Number: 4,777,237

[45] Date of Patent: Oct. 11, 1988

[54] POLYMER FROM (1) BIS-IMIDE, (2) ALLYLOXY-PHENYL MALEIMIDE AND (3) DIAMINE

[75] Inventors: Rene Dien, Millery; Michel Rakoutz, Brignais, both of France

[73] Assignee: Rhone-Poulenc Specialities Chimiques, Courbevoie, France

[21] Appl. No.: 929,838

[22] Filed: Nov. 13, 1986

[30] Foreign Application Priority Data

Nov. 13, 1985 [FR] France .............................. 85 16970

[51] Int. Cl.$^4$ ............................................ C08G 73/12
[52] U.S. Cl. .................................... 528/322; 528/170; 528/312; 528/313; 528/318; 548/548; 548/549
[58] Field of Search ................................ 528/322, 170

[56] References Cited

U.S. PATENT DOCUMENTS 4,035,345  7/1977  Ducloux et al. ................ 260/780 A
4,401,777  8/1983  Tsuboi et al. ....................... 528/322

*Primary Examiner*—Harold D. Anderson
*Attorney, Agent, or Firm*—Burns, Doane, Swecker & Mathis

[57] ABSTRACT

Novel, heat-stable imido polymers, well adopted, e.g., as coating or molding resins, comprise the polymerizates of (a) at least one N,N'-bismaleimide, (b) at least one diprimary diamine, and (c) at least one N-(meth)-allyloxyphenylmaleimide.

12 Claims, No Drawings

POLYMER FROM (1) BIS-IMIDE, (2) ALLYLOXY-PHENYL MALEIMIDE AND (3) DIAMINE

CROSS-REFERENCE TO RELATED APPLICATION

Our copending application, U.S. Ser. No. 929,837, filed concurrently herewith and assigned to the assignee hereof.

BACKGROUND OF THE INVENTION

1. Field of the Invention:

The present invention relates to novel heat-stable polymers, and, more especially, to certain novel bisimido copolymers.

2. Description of the Prior Art:

There have already been described in this art polymers obtained by reacting an N,N'-bisimide of an unsaturated dicarboxylic acid such as, for example, an N,N'-bismaleimide with a diprimary diamine (French Pat. No. 1,555,564). The amounts of N,N'-bisimide and of diamine are selected such that the ratio:

$$\frac{\text{number of moles of bisimide}}{\text{number of moles of diamine}}$$

is at least equal to 1; it is generally preferred, furthermore, that it should be less than 50. Heat-stable resins are obtained which withstand severe thermal stresses remarkably well.

The abovementioned French patent also indicates that the preparation of these resins may be carried out in bulk, by heating the reactants which have previously been subjected to intimate mixing or, alternatively, in an inert polar diluent, such as dimethylformamide, N-methylpyrrolidone, or dimethylacetamide, it being possible to employ this latter process when, for example, ultimate application of the polymer mandates use of a solution thereof.

Finally, it is mentioned that for many uses it is advantageous to carry out the polymerization in two steps; in a first stage, a prepolymer is prepared by heating the intimate admixture of the two reactants to a temperature on the order of 100° to 250° C. The prepolymer obtained may be used in the form of a solution, suspension, powder, or, alternatively, it may also be shaped by merely being cast hot. In a second stage, the curing of the prepolymer may be effected by heating same to temperature on the order of 350° C., under pressure if desired.

SUMMARY OF THE INVENTION

A major object of the present invention is the provision of novel imido copolymers comprising the polymerizate of:

(a) an N,N'-bisimide having the formula:

$$\begin{array}{c} \text{CH-CO} \\ \| \\ \text{Y-C - CO} \end{array} \!\!\! \diagdown \!\!\! \text{N-A-N} \!\!\! \diagup \!\!\! \begin{array}{c} \text{CO-CH} \\ \| \\ \text{CO-C-Y} \end{array} \quad (\text{I})$$

in which the symbol Y denotes H, CH$_3$ or Cl; the symbol A denotes a divalent radical selected from among cyclohexylenes, phenylenes, 4-methyl-1,3-phenylene, 2-methyl-1,3-phenylene, 5-methyl-1,3-phenylene, 2,5-diethyl-3-methyl-1,4-phenylene and the radicals of the formula:

<chemical structure showing two substituted benzene rings connected by T, with X substituents> in which T denotes a single valency bond or a group:

$$-\text{CH}_2-;\ -\underset{\underset{\text{CH}_3}{|}}{\overset{\overset{\text{CH}_3}{|}}{\text{C}}}-;\ -\text{O}-;\ -\underset{\underset{\text{O}}{\|}}{\overset{\overset{\text{O}}{\|}}{\text{S}}}-;\ \text{H}-\text{C}-\text{phenyl};$$

cyclohexylidene; $-\text{O}-\text{phenyl}-\text{SO}_2-\text{phenyl}-\text{O}-$ and X denotes a hydrogen atom or a methyl, ethyl or isopropyl radical;

(b) a diprimary diamine of the formula:

$$\text{H}_2\text{N}-\text{B}-\text{NH}_2 \quad (\text{II})$$

in which the symbol B denotes one of the divalent radicals represented by the symbol A, with the proviso that A and B may be identical or different; and (c) a copolymerizable unsaturated comonomer of the formula:

$$\begin{array}{c} \text{CH-CO} \\ \| \\ \text{CH-CO} \end{array} \!\!\! \diagdown \!\!\! \text{N}-\text{phenyl}-\text{O}-\text{CH}_2-\text{C}(\text{H or CH}_3)=\text{CH}_2 \quad (\text{III})$$

in which the allyloxy or methallyloxy radical is in an ortho-, meta- or para-position with respect to the benzene ring carbon atom bonded to the nitrogen atom.

DETAILED DESCRIPTION OF THE PREFERRED EMBODIMENTS OF THE INVENTION

More particularly according to the present invention, exemplary of the bisimides of the formula (I), representative are, in particular:
N,N'-meta-phenylenebismaleimide,
N,N'-para-phenylenebismaleimide,
N,N'-4,4'-diphenylmethanebismaleimide,
N,N'-4,4'-diphenyl ether bismaleimide,
N,N'-4,4'-diphenyl sulfone bismaleimide,
N,N'-1,4-cyclohexylenebismaleimide,
N,N'-4,4'-diphenyl-1,1-cyclohexanebismaleimide,
N,N'-4,4'-diphenyl-2,2-propanebismaleimide,
N,N'-4,4'-triphenylmethanebismaleimide,
N,N'-2-methyl-1,3-phenylenebismaleimide,
N,N'-4-methyl-1,3-phenylenebismaleimide,
N,N'-5-methyl-1,3-phenylenebismaleimide.

These bismaleimides may be prepared according to the processes described in U.S. Pat. No. 3,018,290 and British Pat. No. 1,137,290. N,N'-4,4'-diphenylmethanebismaleimide is preferably used according to the present invention.

Exemplary of the diamines of the formula (II), representative are, in particular:
para-phenylenediamine,
meta-phenylenediamine,
4,4'-diaminodiphenylmethane,
2,2-bis(4-aminophenyl)propane, benzidine,
bis(4-aminophenyl)oxide,
4,4'-diaminodiphenyl sulfone.

4,4'-Diaminodiphenylmethane is preferably used according to the present invention.

Insofar as the copolymerizable unsaturated comonomeer (c) of the formula (III) is concerned, the following compounds are representative:
N-(2-allyloxyphenyl)maleimide,
N-(3-allyloxyphenyl)maleimide,
N-(4-allyloxyphenyl)maleimide,
N-(2-methallyloxyphenyl)maleimide,
N-(3-methallyloxyphenyl)maleimide,
N-(4-methallyloxyphenyl)maleimide.

The maleimides of the formula (III) are novel compound which can be prepared, in particular, from aminophenols (ortho-, meta- or para-) using the Claisen reaction.

For example, aminophenol, the amino group of which is first blocked by reaction with acetic anhydride to form acetamidophenol, may be reacted, depending upon the particular circumstances, with an allyl halide (typically the bromide) or with a methallyl halide in solution in acetone and in the presence of dipotassium carbonate. The amino group is then regenerated by hydrolysis.

The corresponding maleimide is then prepared in conventional manner by reacting the allyloxyaniline or the methallyloxyaniline previously obtained with maleic anhydride, in solution, in the presence of acetic anhydride, triethylamine and a nickel salt (in particular, nickel acetate).

N-(allyloxyphenyl)maleimide or N-(methallyloxyphenyl)maleimide is thus prepared.

N-(4-allyloxyphenyl)maleimide is a solid, mustard-yellow in color, having a melting point of approximately 103° C.

Its NMR analysis is consistent with the following structure:

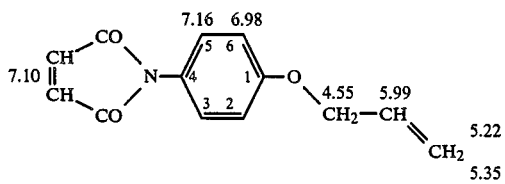

¹H-NMR; solvent: DMSO-d₆; reference: hexamethyldisiloxane (HMDS)
δ7.16 (2H, m): H 3,5;
δ7.10 (2H, s): maleimido;
δ6.98 (2H, m): H 2,6;
δ5.99 (1H, m): —CH=;
δ5.35 and 5.22 (2H, dd): =CH₂;
δ4.55 (2H, d): OCH₂.

N-(3-allyloxyphenyl)maleimide is a viscous orange-yellow liquid which crystallizes slowly at ambient temperature and which boils at approximately 150° C. at a pressure of 20 Pa.

Its NMR analysis is consistent with the following structure:

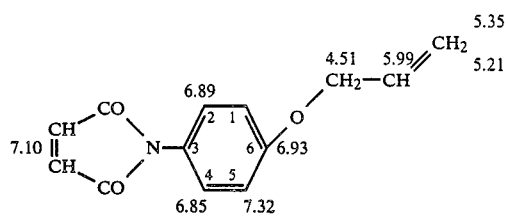

¹H-NMR; solvent: DMSO-d₆; reference: HMDS
δ6.85, 6.89 and 6.93 (3H, m): H4, H2 and H6;
δ7.10 (2H, s): maleimido;
δ7.32 (1H, t): H5;
δ5.99 (1H, m): —CH=;
δ5.35 and 5.21 (2H, dd): =CH₂;
δ4.51 (2H, d): OCH₂.

N-(2-allyloxyphenyl)maleimide is a light-yellow crystalline solid with a melting point of approximately 82° C. and a boiling point of 148° C. to 155° C. at a pressure of 20 Pa.

Its NMR analysis is consistent with the following structure:

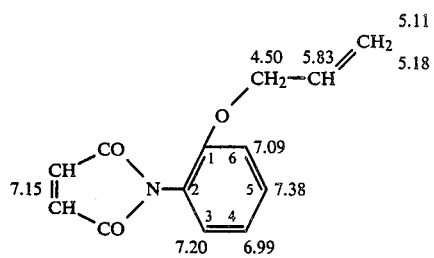

¹H-NMR; solvent: DMSO-d₆; refrence: HMDS
δ7.38 (1H, dt): H5;
δ7.20 (1H, dd): H3;
δ7.15 (2H, s): maleimido;
δ7.09 (1H, dd): H6;
δ6.99 (1H, dt): H4;
δ5.83 (1H, m): —CH=;
δ5.18 and 5.11 (2H, dd): =CH₂;
δ4.50 (2H, d): OCH₂.

N-(4-methallyloxyphenyl)maleimide is a beige-colored solid having a melting point of 64° C.

Its NMR analysis is consistent with the following structure:

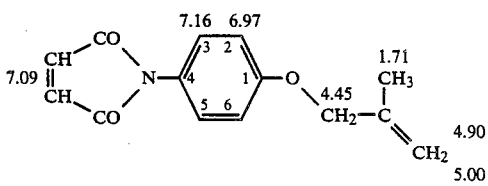

¹H-NMR; solvent: DMSO-d₆; reference: HMDS
δ7.16 (2H, d): H 3,5;
δ7.09 (2H, s): maleimido;
δ6.97 (2H, d): H 2,6;
δ4.90 and 5.00 (1H, s): CH₂=;
δ4.45 (2H, s): OCH₂;
δ1.17 (3H, s): CH₃.

N-(3-methallyloxyphenyl)maleimide is a beige-colored solid having a melting point of 39° C.

Its NMR analysis is consistent with the following structure:

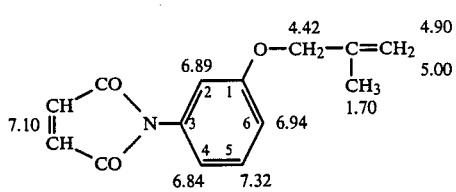

1-HMR; solvent: DMSO $d_6$; reference: HMDS $\delta 7.32$ (1H, t): H5;
$\delta 7.10$ (2H, s): maleimido;
$\delta 6.94$ (1H, d): H6;
$\delta 6.89$ (1H, s): H2;
$\delta 6.84$ (1H, d): H4;
$\delta 4.90$ and 5.00 (1H, l): $CH_2=$;
$\delta 4.42$ (2H, s): $OCH_2$;
$\delta 1.70$ (3H, s): $CH_3$.

N-(2-methallyloxyphenyl)maleimide is a beige-colored solid having a melting point of 96° C.

Its NMR analysis is consistent with the following structure:

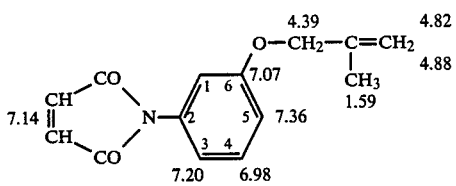

$^1$H-NMR; solvent: DMSO $d_6$; reference: HMDS $\delta 7.36$ (1H, t): H5;
$\delta 7.20$ (1H, d): H3;
$\delta 7.14$ (2H, s): maleimido;
$\delta 7.07$ (1H, d): H6;
$\delta 6.98$ (1H, t): H4;
$\delta 4.82$ and 4.88 (1H, s): $CH_2=$;
$\delta 4.39$ (2H, s): $OCH_2$;
1.59 (3H, s): $CH_3$.

It will be appreciated that, in order to prepare the polymers according to the present inventiion, it is also possible to use a mixture of several bisimides of the formula (I), as well as a mixture of several diamines of the formula (II). Similarly, the term copolymerizable unsaturated comonomer of the formula (III) also connotes mixtures of several ortho-, meta- and/or para-isomers of the allyloxy and/or methallyloxy type.

With regard to the polymers obtained, according to French Pat. No. 1,555,564, by heating an N,N'-bisimide and a diamine, the addition of a copolymerizable unsaturated comonomer such as (c):

when using, furthermore, reactant proportions determined particularly such that the ratio $r_1$:

$$\frac{\text{total number of moles of bisimide } (a) \text{ and of monomer } (c)}{\text{number of moles of diamine } (b)}$$

is equal to the ratio $r_2$:

$$\frac{\text{number of moles of bisimide}}{\text{number of moles of diamine}}$$

employed to produce the bisimide/diamine polymer for purposes of comparison, makes it possible to obtain, unexpectedly, thermosetting polymers which, on the one hand, have a pot life (in general this is the period of time after which the viscosity of the polymer in solution form has doubled) which is increased and, on the other hand, are notable for a content of free diprimary diamine which is markedly lowered. The increase in pot life is an advantage which makes the thermosetting polymer easier to use and which makes it possible to produce molded articles having satisfactory homogeneity, and hence satisfactory reproducibility. The lowering of the free diamine content is also of great value, because certain of these compounds may be toxic to some degree.

The amounts of N,N'-bisimide(s) (a), of diamine(s) (b) and of comonomers(s) (c) are selected such that:

on the one hand, the ratio $r_1$:

$$\frac{\text{total number of moles of bisimide}(s) \ (a)}{\text{and of comonomer}(s) \ (c)}{\text{number of moles of diamine}(s) \ (b)}$$

is within the range of from 1.2/1 to 10/1 and preferably from 2/1 to 5/1, and, on the other hand, the number of imide groups provided by the monomer(s) (c) represents up to 50% of the total number of imide groups provided by the reactants (a)+(c) and is preferably in the range of from 10 to 35%.

The polymers according to the invention may be prepared by heating the bisimide(s) (a), the diamine(s) (b) and the comonomer(s) (c), at least until a homogeneous liquid mixture is obtained. The temperature may vary depending on the physical state of the compounds present, but generally ranges from 50° C. to 250° C. It is advantageous to maintain the starting compounds in an intimately mixed form before and during the heating. Depending on the physical properties of the ingredients, this measure may be carried out by using the usual methods for mixing finely divided solids or, alternatively, in producing a suspension of some of the ingredients in one or more other ingredients in a liquid state.

The preparation of the polymers according to the invention may also be carried out by heating the mixture of the reactants in an organic diluent which is liquid over at least a part of the range 50° C.–250° C. Exemplary of such diluents, representative are, in particular, aromatic hydrocarbons, such as xylenes and toluene, halogenated hydrocarbons, such as chlorobenzenes, ethers, such as dioxane, tetrahydrofuran and dibutyl ether, dimethylformamide, dimethyl sulfoxide, N-methylpyrrolidone, methyl glycol and methyl ethyl ketone. The polymer solutions or suspensions may be employed, as such, for numerous applications; the polymers may also be isolated, for example, by filtration, if desired after precipitation by means of an organic diluent which is miscible with the solvent employed. In this respect, a hydrocarbon whose boiling point does not markedly exceed 120° C. may be used to advantage.

It will also be appreciated that the properties of the polymers according to the invention may vary widely, especially depending on the precise nature of the imide reactant (a), of the amine reactant (b), and of the unsaturated reactant (c), on the proportions of reactants which are selected and on precise temperature conditions adopted within the aforementioned range. Insofar as the resultant polymers are concerned, these may be hardened or cured polymers which are insoluble in the usual solvents, e.g., those solvents noted in the previous paragraph and which do not exhibit any appreciable softening below the temperature at which they begin to decompose.

However, these polymers may also comprise prepolymers (P) which are soluble in polar organic solvents and have a softening point at a temperature below 200° C. (this softening point generally ranges from 50° to 150° C.). These prepolymers may be obtained in bulk, by heating the mixture of reactants until a homogeneous or pasty product is obtained at a temperature which generally ranges from 50° to 180° C. for a period of time which may range from a few minutes to several hours, this period being proportionately shorter the higher the temperature which is used.

It too should be appreciated that these prepolymers (P) may also be prepared by forming, from bisimide(s) (a) and the diamine(s) (b), a prepolymer (PP) which is then reacted with the monomer(s) (c). It is also possible to prepare a prepolymer (P'P') beforehand by heating the mixture of diamine(s) (b) and monomer(s) (c), and then reacting it with the bisimide(s) (a) to produce the prepolymer (P). The conditions of temperature and time used for the preparation of the prepolymers (PP) or (P'P') and for their conversion into prepolymers (P) are those indicated earlier in conjunction with the preparation of the prepolymers (P) by directly mixing the reactants (a), (b) and (c).

The prepolymers (P) may be employed in the form of a liquid mass, simple casting while hot being sufficient for shaping and producing molded articles. It is also possible, after they have been cooled and ground, to use them in the form of powders which are remarkably well suited for compression molding operations, if desired in the presence of fillers in the form of powders, spheres, granules, fibers or flakes. In the form of suspensions or solutions, the prepolymers (P) may be used for the production of coatings and of preimpregnated intermediate articles whose reinforcement may consist of fibrous materials based on aluminum or zirconium silicate or oxide, carbon, graphite, boron, asbestos or glass. These prepolymers (P) may also be employed for the production of cellular materials after a blowing agent such as, for example, azodicarbonamide, has been added.

In a second stage, the prepolymers (P) may be cured by heating same to temperatures on the order of 300° C., generally from 150° to 250° C.; an additional shaping operation may be carried out during the cure, under vacuum or at a superatmospheric pressure if desired, it also being possible for these operations to be consecutive. The curing may be carried out in the presence of a radical polymerization initiator, such as lauroyl peroxide, azobisisobutyronitrile or an anionic polymerization catalyst, such as diazabicyclooctane.

It is also within the ambit of the invention to prepare the cured polymers according to the invention by using an intimate mixture of prepolymer (PP) and of monomer(s) (c) or an intimate mixture of prepolymer (P'P') and of bisimide(s) (a) which are heated in bulk under the conditions described above.

The preparation of the polymers according to the invention may be carried out in the presence of a catalyst selected from among oxygen-containing mono- or polyacids of inorganic or organic origin, at least one of the acid functions of which has an ionization constant pK$_a$ in water at 25° C. of less than 5; the operation can also be carried out in the presence of a mixture of two or more such acids. These may advantageously be mono- or polycarboxylic acids and either may be simple in structure or may possess groups which do not interfere with the reaction between the bisimide (a), the diamine (b) and the monomer (c); exemplary of such acid(s), representative are:
acetic acid,
monochloroacetic acid,
dichloroacetic acid,
fumaric acid,
trimellitic acid,
salicylic acid,
phthalic acid (ortho-, meta- or para-)
benzenesulfonic acid,
para-toluenesulfonic acid, and
methanesulfonic acid.

The amount of catalyst used, when indeed present, generally constitutes from 0.1 to 5% based on the total weight of the reactants (a)+(b)+(c) introduced.

When the preparation of the polymers according to the invention is carried out by direct heating of the reactants (a), (b) and (c) to produce either a cured polymer or a prepolymer (P), the catalyst is generally added together with the abovementioned reactants, preferably before the heating commences.

When the preparation of the polymers according to the invention is carried out by forming a prepolymer (PP) or (P'P') in a first step, the catalyst is generally introduced into the mixture used to prepare these prepolymers (PP) or (P'P'), preferably before the heating commences.

The polymers according to the invention are of interest to those sectors of industry which require materials having good mechanical and electrical properties, together with a high degree of chemical inertness at temperatures of from 200° to 300° C. As specific examples, they are suitable for the manufacture of plate or tubular insulators for electrical transformers, printed circuit boards, pinions, rings, and the like. The preimpregnated articles can be used for producing components of various shapes and for various purposes in many industries, such as, for example, in aeronautics. These components, typically laminates, which may be solids of revolution, are produced by stacking several layers of prepregs onto a former or a substrate. It will be appreciated that to produce molded articles, for example, it is possible to start either with the mixture of bisimide(s) (a)+diamine(s) (b)+monomer(s) (c), or with a prepolymer (P). When starting directly from the mixture of the reactants, this mixture is formed into the shape of the required article and the curing is then produced by heating. When beginning with the prepolymer (P), this may be molded by simple casting when hot, or by injection molding, and curing thereof is then done by heating.

In order to further illustrate the present invention and the advantages thereof, the following specific examples are given, it being understood that same are intended only as illustrative and in nowise limitative.

EXAMPLE 1

(1) Several mixtures were prepared, each containing:
(i) 6.43 g (0.0179 mole) of N,N'-4,4'-diphenylmethanebismaleimide,
(ii) 1.97 g (0.0099 mole) of 4,4'-diaminodiphenylmethane (abbreviated to DDM), and (iii) 1.60 g (0.0069 mole) of N-(allyloxyphenyl)maleimide isomer [the ortho-isomer or N-(2-allyloxyphenyl)maleimide will be denoted hereinafter by the abbreviation ortho-AMP; the meta-isomer or N-(3-allyloxyphenyl)maleimide will be denoted by the abbreviation meta-APM, and the para-isomer or N-(4-allyloxyphenyl)maleimide will be denoted by the abbreviation para-APM] [the ratio $r_1$ is, in this case, equal to 2.5/1 and the number of imide groups contributed by APM isomer constitutes 16.2% of the total number of imide groups contributed by the reactants, etc].

Each of these mixtures was reacted in a test tube having an internal diameter of 1.5 cm and a height of 18 cm. For such purpose, the tube was immersed in a constant-temperature bath at 130° C. or 160° C. for periods of time ranging from 20 minutes to 2 hours, 10 minutes, with care being taken to agitate the reaction mixture during the period when it was melting. Upon completion of the selected reaction time, which was included in the abovementioned time period, the tube was taken out of the constant-temperature bath and was then cooled under a stream of water at 15° C. The solidified prepolymer obtained was recovered and was then ground into powder form.

The softening point (abbreviated to SP) of the prepolymer was then determined using this powder, and this represents the degree of overall progress of the reaction. To carry out this measurement, powder was introduced to a height of 16 mm±2 mm into an aluminum tube having an internal diameter of 4 mm. This tube was placed vertically in an oven permitting a temperature rise at a rate of 25° to 30° C. per minute. A plunger having a diameter of 3 mm was inserted into the tube and it had a weight which was determined such as to subject the powder to a pressure of 70 g/mm². The softening point was the temperature reached at the moment when the plunger had travelled 5 mm freely, as a result of its own weight, while the powder was being heated.

The content of free unreacted 4,4'-diaminodiphenylmethane remaining in the prepolymer obtained was also determined. This determination consisted of extracting the free diamine from the prepolymer using acetonitrile and then tetrahydrofuran (25 cm³ of each solvent in succession per 0.250 g of prepolymer); the diamine in the extract obtained was determined by liquid chromatography under pressure; the results are reported as the percentage of free diamine based on the weight of prepolymer.

The results obtained are reported in Table 1 below:

TABLE 1

| APM isomer | Reaction temperature °C. | Reaction time | SP °C. | Free DDM % |
|---|---|---|---|---|
| meta- | 130 | 1 hr | 82.5 | 1.6 |
| — | — | 1 hr, 20 min | 89.5 | 1.2 |
| — | — | 2 hr | 100.2 | 0.4 |
| — | — | 20 min | 96.1 | 1.6 |
| — | — | 30 min | 110.4 | 0.9 |
| ortho- | 130 | 1 hr | 75 | 3.45 |
| — | — | 1 hr, 30 min | 86.5 | 1.8 |
| — | — | 2 hr, 20 min | 97.9 | 0.6 |
| — | — | 20 min | 81.6 | 2.9 |
| — | — | 40 min | 109 | 0.75 |
| para- | 130 | 1 hr | 94.2 | 1.0 |
| — | — | 1 hr, 10 min | 97.5 | 0.85 |
| — | — | 1 hr, 30 min | 105.6 | 0.3 |
| — | 160 | 12 min | 88.7 | 1.8 |

TABLE 1-continued

| APM isomer | Reaction temperature °C. | Reaction time | SP °C. | Free DDM % |
|---|---|---|---|---|
| — | — | 20 min | 116.2 | 0.3 |

(2) As a comparative test (test A), the same operations as those described above were reproduced, but using mixtures of:
 (i) 8.19 g (0.0229 mole) of N,N'-4,4'-diphenylmethanebismaleimide, and
 (ii) 1.81 g (0.0091 mole) of 4,4'-diaminodiphenylmethane [the ratio $r_2$ was equal to 2.51/1].

The mixtures prepared were reacted at 130° C. or 160° C. for 10 to 40 minutes. The following results were obtained:

TABLE 2

| Reaction temperature °C. | Reaction time | SP °C. | Free DDM % |
|---|---|---|---|
| 130 | 20 min | 81.5 | 5 |
| — | 40 min | 100.6 | 2.85 |
| 160 | 10 min | 76.5 | 5.5 |
| — | 14 min | 107.5 | 3.4 |

It will be seen, therefore, that the prepolymers obtained according to the prior art have free DDM contents ranging from 2.85% to 5.5% for SPs of between 76.5° C. and 107.5° C. By using the method according to the present invention, the residual DDM content can be reduced to values of 0.3% to 1.8% for SPs of 82.5° C. to 109° C.

(3) As another comparative test (test B), the same operations as those described above were reproduced, but using mixtures of:
 (i) 6.69 g (0.0186 mole) of N,N'-4,4'-diphenylmethanebismaleimide,
 (ii) 2.05 g (0.0103 mole) of 4,4'-diaminodiphenylmethane, and
 (iii) 1.26 g (0.0072 mole) of N-phenylmaleimide [the ratio $r_1$ was, in this case, equal to 2.50/1 and the number of imide groups contributed by N-phenylmaleimide represented 16.2% of the total number of imide groups contributed by the reactants].

The mixtures prepared were reacted at 130° C. or 160° C. for 12 minutes to 1 hour, 20 minutes. The following results were obtained:

TABLE 3

| Reaction temperature °C. | Reaction time | SP °C. | Free DDM % |
|---|---|---|---|
| 130 | 1 hr | 96.6 | 2.4 |
| — | 1 hr, 20 min | 106.5 | 1.5 |
| 160 | 20 min | 119.2 | 2.5 |
| — | 12 min | 79.5 | 5.5 |

(4) Description of the preparation of the three N-(allyloxyphenyl)maleimide isomers:

4.1 Para-APM:

This compound was prepared from 4-allyloxyaniline, a method of producing same being described in *Journal of American Chemical Society*, 44, pages 1741 to 1744 (1922).

The following materials were introduced simultaneously over 20 minutes, by means of two dropping funnels, into a glass reactor equipped with a central stirrer, a thermometer and a reflux condenser, maintained at 50° C. under stirring, under a gentle flow of nitrogen:

(i) 249 g of an acetone solution containing 149.0 g of 4-allyloxyaniline, (ii) 249 g of an acetone solution containing 112.7 g of maleic anhydride.

The reaction was exothermic and resulted in the immediate formation of a yellowish suspension.

When the additions were complete, each dropping funnel was rinsed with 10 cm³ of acetone which was then added to the continuously stirred reaction mixture.

163.2 g of acetic anhydride were charged into the funnel which contained maleic anhydride and 45.4 g of triethylamine were charged into the other funnel.

Both of these compounds were then run into the reactor over 5 minutes, followed by the addition of 1.9 cm³ of an aqueous solution containing 0.0528 mole of nickel sulfate per 100 cm³ of solution.

The reaction mixture was stirred under reflux for 2 hr, 30 min. The temperature was then reduced to 30° C., 1349 g of distilled water were added, and then the mixture was cooled to 15° C. under stirring.

The dark yellow precipitate was filtered off, washed with 100 cm³ of an 80/20 mixture, on a volume basis, of acetone and water, cooled to 10° C. beforehand, and then with 100 cm³ of distilled water.

The filtered solid was dried for 15 hr at 40° C. under reduced pressure (30 Pa).

215.5 g of a powdery product were thus obtained, mustard yellow in color and having a melting point of 103° C.

Its NMR spectrum was consistent with the structure of N-(4-allyloxyphenyl)maleimide.

4.2 Meta-APM:

The apparatus used was the same as above and the same procedure was followed.

The starting material was 3-allyloxyaniline, a method for the preparation of which being described in *Chemical Abstracts*, 51, 4423 (a) to (g) (1957).

The charges used were double those in section 4.1:

(i) 498 g of an acetone solution containing 298.0 g of 3-allyloxyaniline, (ii) 498 g of an acetone solution containing 225.4 g of maleic anhydride, rinsing of each dropping funnel with 20 cm³ of acetone, (iii) 326.4 g of acetic anhydride, (iv) 90.8 g of triethylamine, (v) 3.8 cm³ of aqueous solution containing 0.0528 mole of nickel sulfate per 100 cm³ of solution, and (vi) 2698 g of distilled water.

The addition of 2698 g of distilled water to the reaction mixture resulted in the separation of a dark-colored oil, which was extracted with three 250-cm³ portions of ethyl acetate. The organic layers obtained were combined and were dried over sodium sulfate.

After removal of the solvent to dryness under reduced pressure (initially at approximately 3,000 Pa and then at approximately 70 Pa), 464 g of a very dark viscous oil were obtained, containing 0.309 ethylenic double bond per 100 g, determined by titration.

22.77 g of this crude product were taken and 0.2 g of hydroquinone was added to this material. The latter was distilled at 12 Pa in a 50-cm³ reactor fitted with a Vigreux column and a fraction collector.

14.7 g of a fraction which distilled between 150° C. and 155° C. at 20 Pa were collected.

This was an orange-yellow, clear, viscous liquid, whose NMR spectrum was consistent with the structure of N-(3-allyloxyphenyl)maleimide.

(4.3) Ortho-APM:

This compound was prepared from 2-allyloxyaniline, the preparation of which is described in *Journal of American Chemical Society*, 70, page 593 (1948).

The following materials were introduced simultaneously over 30 minutes, using 2 dropping funnels, into a glass reactor fitted with a central stirrer, a thermometer and a reflux condenser, maintained at 50° C. under stirring and through which a gentle flow of nitrogen was passed:

(i) 443 cm³ of an acetone solution containing 298 g of 2-allyloxyaniline, (ii) 443 cm³ of an acetone solution containing 235.2 g of maleic anhydride.

The reaction was exothermic and resulted in the immediate formation of a yellowish suspension.

When the additions were complete, each funnel was rinsed with 10 cm³ of acetone, which was then added to the continuously stirred reaction mixture.

265.2 g of acetic anhydride were charged into the funnel which contained maleic anhydride, and 60.6 g of triethylamine were charged into the other funnel.

Both of these compounds were then run into the reactor over 6 minutes, followed by the addition of 3.8 cm³ of an aqueous solution containing 0.0528 mole of nickel acetate per 100 cm³ of solution.

The reaction mixture was stirred under reflux for 2 hr, 30 minutes. The temperature was then reduced to 30° C., 2500 g of distilled water were added and then the mixture was cooled to 20° C. under stirring.

A black oil separated on the surface of the aqueous phase. The aqueous phase was siphoned off and the oily phase was taken up with 400 cm³ of ethyl acetate. The organic phase was washed twice with 500-cm³ portions of distilled water until the pH of the washes was equal to 6. The separated organic phase was dried over 150 g of anhydrous sodium sulfate.

After removal of the solvent to dryness under reduced pressure (initially at approximately 3000 Pa and then at approximately 70 Pa), 450 g of a very dark, viscous oil were obtained and were treated with 560 cm³ of ethyl alcohol; the mixture was cooled in ice to 5° C. and was filtered. 416 g of a damp, beige-colored precipitate were obtained. This was dried for 15 hours at 40° C. under reduced pressure (30 Pa) and 365 g of a beige-colored crystalline product having a melting point of 82° C. were obtained.

The NMR spectrum was consistent with the structure of N-(2-allyloxyphenyl)maleimide.

EXAMPLE 2

(1) Several mixtures were prepared, each containing:

(i) 6.36 g (0.0177 mole) of N,N'-4,4'-diphenylmethanebismaleimide, (ii) 1.96 g (0.0099 mole) of 4,4'-diaminodiphenylmethane, and (iii) 1.68 g (0.0069 mole) of an N-(methallyloxyphenyl)maleimide isomer [the ortho-isomer or N-(2-methallyloxyphenyl)maleimide will hereinafter be denoted by the abbreviation ortho-MAPM, the meta-isomer or N-(3-methallyloxyphenyl)maleimide will be denoted by the abbreviation meta-MAPM, and the para-isomer or N-(4-methallyloxyphenyl)maleimide will be denoted by the abbreviation para-MAPM] [the ratio $r_1$ was, in this case, equal to 2.48/1 and the number of imide groups contributed by the MAPM isomer represented 16.3% of the total number of imide groups contributed by the reactants].

These mixtures were reacted in a test tube using the method described in Example 1. The results obtained are reported in the following table:

TABLE 4

| MAMP isomer | Reaction temperature °C. | Reaction time | SP °C. | Free DDM % |
|---|---|---|---|---|
| meta | 130 | 1 hr | 94.2 | 0.5 |
| — | — | 2 hr | 111.9 | 0.05 |
| — | — | 20 min | 101.4 | 0.3 |
| — | — | 38 min | 127.9 | 0.01 |
| ortho | 130 | 1 hr | 78.5 | 1.5 |
| — | — | 1 hr, 30 min | 89.7 | 0.85 |
| — | — | 2 hr | 98.3 | 0.40 |
| — | 160 | 20 min | 78.2 | 2.15 |
| — | — | 45 min | 109 | 0.30 |
| para | 130 | 1 hr | 98.6 | 0.75 |
| — | — | 1 hr, 30 min | 108.1 | 0.25 |
| — | 106 | 20 min | 103.6 | 0.55 |

(2) Description of the preparation of the three N-(methallyloxyphenyl)maleimide isomers:

(2.1) PARA-MAPM:

This compound was prepared from 4-methallyloxyaniline.

(2.1.1) 4-Methallyloxyaniline:

This compound was prepared from para-methallyloxyacetamidobenzene. The latter was obtained by a method similar to that for the preparation of ortho-acetamido-phenyl allyl ether, described in *Journal of American Chemical Society*, 70, page 593 (1948), by replacing, however, allyl bromide with methallyl chloride and by operating in the presence of a catalytic amount of potassium iodide (10% on a molar basis relative to methallyl chloride).

The following materials were introduced into a glass reactor fitted with a central stirrer, a thermometer and a reflux condenser:

(i) 205 g of para-methallyloxyacetamidobenzene,
(ii) 400 ml of 5N ethanolic sodium hydroxide; these were thoroughly mixed and 13.6 g of imidazole, i.e., 20% on a molar basis relative to para-methallyloxyacetamidobenzene, were added.

The reaction mixture was stirred under reflux for 3 hours.

The reaction mixture was cooled to 20° C.

Ethanol was removed under reduced pressure (approximately 70 Pa).

250 cm³ of ethyl acetate were added to the reaction mixture, which was then washed twice with 250-cm³ portions of distilled water to give a pH of 7 in the washes.

Ethyl acetate was removed from the organic phase under reduced pressure (approximately 70 Pa) and 165.5 g of crude product were obtained.

135.4 g of purified product were obtained after distillation at 113° C. at 0.05 mm Hg.

The NMR spectrum was consistent with the structure of 4-methallyloxyaniline.

(2.1.2) Para-MAPM:

The following materials were added simultaneously over 15 minutes by means of 2 dropping funnels, into a glass reactor fitted with a central stirrer, a thermometer and a reflux condenser, maintained at 50° C. under stirring, and through which a gentle flow of nitrogen was passed:

(i) 52 cm³ of an acetone solution containing 32.6 g of 4-methallyloxyaniline,
(ii) 52 cm³ of an acetone solution containing 22.5 g of maleic anhydride.

The reaction was exothermic and produced the immediate formation of a yellowish suspension.

When the additions were complete, each funnel was rinsed with 10 cm³ of acetone which was then added to the continuously stirred reaction mixture.

26.5 g of acetic anhydride were charged into the dropping funnel which contained maleic anhydride, and 6.1 g of triethylamine were charged into the other funnel.

Both of these compounds were then run into the reactor over 5 minutes, followed by the addition of 0.4 cm³ of an aqueous solution containing 0.0528 mole of nickel acetate per 100 cm³ of solution.

The reaction mixture was stirred under reflux for 2 hours, 30 minutes. The temperature was then lowered to 20° C.

The reaction mixture was precipitated by being poured slowly into 500 cm³ of ice-water, with vigorous stirring.

The precipitate was filtered off, rewashed with cooled distilled water and dried for 15 hours at 40° C. under reduced pressure (30 Pa). 39.4 g of a beige-colored precipitate having a melting point of 64° C. were obtained.

The NMR spectrum was consistent with the structure of N-(4-methallyloxyphenyl)maleimide.

(2.2) META-MAPM:

This compound was prepared from 3-methallyloxyaniline.

(2.2.1) 3-Methallyloxyaniline:

The starting material was meta-methallyloxyacetamidobenzene, the conditions for the preparation of which were the same as those described in section 2.1.1 for para-methallyloxyacetamidobenzene.

The following materials were introduced into a glass reactor fitted with a central stirrer, a thermometer and a reflux condenser:

(i) 205 g of meta-methallyloxyacetamidobenzene,
(ii) 400 ml of 5N ethanolic sodium hydroxide; these were thoroughly mixed, and 13.6 g of imidazole, i.e., 20% on a molar basis, were added.

The reaction mixture was stirred under reflux for 3 hours.

The reaction mixture was cooled to 20° C.

Ethanol was removed under reduced pressure (approximately 70 Pa).

250 cm³ of ethyl acetate were added to the reaction mixture, which was then washed twice with 250-cm³ portions of distilled water, to give a pH of 7 in the washes.

Ethyl acetate was removed from the organic phase under reduced pressure (approximately 70 Pa) and 144 g of crude product were obtained.

124 g of purified product were obtained after distillation at 85° C. at 0.05 mm Hg.

The NMR spectrum was consistent with the structure of 3-methallyloxyaniline.

(2.2.2) Meta-MAPM:

The following materials were added simultaneously over 20 minutes by means of 2 dropping funnels, into a glass reactor fitted with a central stirrer, a thermometer and a reflux condenser, maintained at 50° C. under stirring and through which a gentle flow of nitrogen was passed:
(i) 105 cm³ of an acetone solution containing 65.2 g of 3-methallyloxyaniline,
(ii) 105 cm³ of an acetone solution containing 45.0 g of maleic anhydride.

The reaction was exothermic and produced the immediate formation of a yellowish suspension.

When the additions were complete, each funnel was rinsed with 10 cm³ of acetone which was then added to the continuously stirred reaction mixture.

53.0 g of acetic anhydride were charged to the dropping funnel which contained maleic anhydride, and 12.2 g of triethylamine were charged into the other funnel.

Both of these compounds were then run into the reactor over 5 minutes, followed by the addition of 0.8 cm³ of an aqueous solution containing 0.0528 mole of nickel acetate per 100 cm³ of solution.

The reaction mixture was stirred under reflux for 2 hours, 30 minutes. The temperature was then lowered to 20° C.

The reaction mixture was precipitated in 500 cm³ of distilled water at 10° C. The very dark, viscous oil which was collected was washed with 250 cm³ of a pH 7 phosphate buffer and then twice with 500-cm³ portions of distilled water. The product, which had been dried under reduced pressure (30 Pa) for 15 hours at 30° C., was cooled in a mixture of acetone and solid carbon dioxide; 78 g of a beige-colored solid having a melting point of 39° C. were obtained in this manner.

The NMR spectrum was consistent with the structure of N-(3-methallyloxyphenyl)maleimide.

(2.3) ORTHO-MAPM:

This compound was prepared from 2-methallyloxyaniline.

(2.3.1) 2-Methallyloxyaniline:

The starting material was ortho-methallyloxyacetamidobenzene, the conditions for preparing which were the same as those described in section 2.1.1 for para-methallyloxyacetamidobenzene.

The following materials were introduced into a glass reactor fitted with a central stirrer, a thermometer and a reflux condenser:
(i) 205 g of ortho-methallyloxyacetamidobenzene,
(ii) 400 ml of 5N ethanolic sodium hydroxide; these were thoroughly mixed and 13.6 g of imidazole, i.e., 20% on a molar basis, were added.

The reaction mixture was stirred under reflux for 3 hours.

The reaction mixture was cooled to 20° C.

Ethanol was removed under reduced pressure (approximately 70 Pa).

250 cm³ of ethyl acetate were added to the reaction mixture, which was then washed twice with 250-cm³ portions of distilled water, to give a pH of 7 in the washes.

Ethyl acetate was removed from the organic phase under reduced pressure (approximately 70 Pa) and 168.10 g of crude product were obtained.

136.10 g of purified product were obtained after distillation at 81° C. at 0.05 mm Hg.

The NMR spectrum was consistent with the structure of 2-methallyloxyaniline.

(2.3.2) Ortho-MAPM:

The following materials were added simultaneously over 20 minutes by means of two dropping funnels, into a glass reactor fitted with a central stirrer, a thermometer and a reflux condenser, maintained at 50° C. under stirring, through which a gentle flow of nitrogen was passed:
(i) 105 cm³ of an acetone solution containing 65.2 g of 2-methallyloxyaniline,
(ii) 105 cm³ of an acetone solution containing 45.0 g of maleic anhydride.

The reaction was exothermic and produced the immediate formation of a yellowish suspension.

When the additions were complete, each funnel was rinsed with 10 cm³ of acetone which was then added to the continuously stirred reaction mixture.

53.0 g of acetic anhydride were charged into the dropping funnel which contained maleic anhydride, and 12.2 g of triethylamine were charged into the other funnel.

Both of these compounds were then run into the reactor over 5 minutes, followed by the addition of 0.8 cm³ of an aqueous solution containing 0.0528 mole of nickel acetate per 100 cm³ of solution.

The reaction mixture was stirred under reflux for 2 hours, 30 minutes. The temperature was then lowered to 20° C.

The reaction mixture was precipitated in 500 cm³ of iced distilled water with vigorous stirring. The brown-colored precipitate was filtered off, rewashed with cooled distilled water, and dried for 15 hours at 40° C. under reduced pressure (30 Pa), and 70.0 g of a beige-colored precipitate having a melting point of 96° C. were obtained.

The NMR spectrum was consistent with the structure of N-(2-methallyloxyphenyl)maleimide.

EXAMPLE 3

This example describes a thermosetting polymer (P) according to the present invention, which was obtained by using the bisimide (a) and the diamine (b) to form a prepolymer (PP) which was then reacted with the monomer (c):
(i) 6.43 g (0.0179 mole) of N,N'-4,4'-diphenylmethanebismaleimide, and
(ii) 1.97 g (0.0099 mole) of 4,4'-diaminodiphenylmethane were reacted in the test tube described in Example 1.

The reaction temperature was 130° C. and the reaction time was 10 minutes. 1.60 g (0.0069 mole) of N-(2-allyloxyphenyl)maleimide were then added to the prepolymer (PP) obtained and the reaction mixture was maintained at 130° C. for another 50 minutes [the ratio $r_1$ was, in this case, equal to 2.50/1 and the number of imide groups contributed by the APM isomer represented 16.2% of the total number of imide groups contributed by the reactants]. The polymer (P) obtained was cooled under running water at 15° C. and, once solidified, was ground into powder form. The softening point was found to be 79.2° C. The residual DDM content was 1.6%.

EXAMPLE 4

This example describes a thermosetting polymer (P) according to the present invention, which was obtained by using the diamine (b) and the monomer (c) to form a prepolymer (P'P') which was then reacted with the bisimide (a):
(i) 1.97 g (0.0099 mole) of 4,4'-diaminodiphenylmethane, and
(ii) 1.60 g (0.0069 mole) of N-(3-allyloxyphenyl)-maleimide were reacted in the test tube described in Example 1.

The reaction temperature was 130° C. and the reaction time was 10 minutes. 6.43 g (0.0179 mole) of N,N'-4,4'-diphenylmethanebismaleimide were then added to the prepolymer (P'P') obtained and the reaction mixture was maintained at 130° C. for another 55 minutes [the ratio $r_1$ was, in this case, equal to 2.50/1 and the number of amide groups contributed by the APM isomer represented 16.2% of the total number of imide groups contributed by the reactants]. The prepolymer (P) obtained was cooled under running water at 15° C.; once solidified, it was ground into powder form. The softening point was found to be 92.2° C. The residual DDM content was 1.5%.

EXAMPLE 5

(1) A glass reactor fitted with an anchor-type stainless steel stirrer and with a side tube permitting volatile products to escape was preheated in a bath at 160° C. The following materials were charged therein in succession:

(i) 12.8 g (0.0559 mole) of N-(3-allyloxyphenyl)maleimide, (ii) followed by the powder mixture comprising 51.44 g (0.1437 mole) of N,N'-4,4'-diphenylmethanebismaleimide and 15.76 g (0.0796 mole) of 4,4'-diaminodiphenylmethane [the ratio $r_1$ was equal to 2.51/1 and the number of imide groups contributed by the APM isomer represented 16.3% of the total number of the imide groups contributed by the reactants].

After stirring for 8 minutes, including 6 minutes at a reduced pressure of 665 Pa, while operating at a temperature of 130° C. to 148° C., a clear prepolymer was obtained. This prepolymer was then cast into a parallelepipedal mold preheated to 150° C. in order to prepare plaques 140×100×4 mm in size. The plaques obtained were subjected to a cure cycle as specified below:

(a) 40 minutes at a temperature rising gradually from 150° C. to 200° C.,
(b) then 2 hours at 200° C.,
(c) then 30 minutes at a temperature rising from 200° C. to 250° C.,
(d) then 16 hours at 250° C.,
(e) then 1 hour between 250° C. and 100° C. (gradual cooling).

After demolding, the plaques based on cured polymer were cut to produce specimens 30×7×4 mm in size which were used to measure the flexural strength (Sf) and modulus (Mf) at 20° C. and at 250° C. Measurements of flexural strength and modulus were also made using specimens which had been maintained for 1,000 hours at 250° C. The results obtained are reported in Table 5 below.

(2) By way of a comparative test (test C), the same operations as those described above were reproduced, but this time using as charge a powdered mixture containing:

(i) 65.5 g (0.1829 mole) of N,N'-4,4'-diphenylmethanebismaleimide, and (ii) 14.5 g (0.0732 mole) of 4,4'-diaminodiphenylmethane [the ratio $r_2$ was, in this case, equal to 2.49/1].

After stirring for 10 minutes, including 9 minutes under a reduced pressure of 665 Pa, a homogeneous and clear prepolymer was obtained, which was molded, cured and tested as indicated above. The results obtained are also reported in Table 5 below.

EXAMPLE 6

A powder mixture containing:

(i) 51.44 g (0.1437 mole) of N,N'-4,4'-diphenylmethanebismaleimide, and (ii) 15.76 g (0.0796 mole) of 4,4'-diaminodiphenylmethane was charged into a glass reactor preheated in a bath at 130° C.

The mixture was allowed to react for 13 minutes and 12.8 g (0.0559 mole) of N-(2-allyloxyphenyl)maleimide were then added [the ratio $r_1$ was, in this case, equal to 2.51/1 and the number of imide groups contributed by the APM isomer represented 16.3% of the total number of imide groups contributed by the reactants].

After heating at 130° C. for 12 minutes, including 4 minutes at a reduced pressure of 400 Pa, a prepolymer was obtained, which was molded, cured and tested as indicated in Example 5. It should be noted that the prepolymer cure cycle was as follows:

(a) 40 minutes at 130° C.,
(b) then 20 minutes at a temperature rising gradually from 130° C. to 150° C.,
(c) 30 minutes at a temperature rising gradually from 150° C. to 200° C.,
(d) then 2 hours at 200° C.,
(e) then 30 minutes at a temperature rising gradually from 200° C. to 250° C.,
(f) then 16 hours at 250° C.,
(g) then 1 hour of gradual cooling from 250° C. to 100° C.

The results obtained are also reported in Table 5 below.

EXAMPLE 7

The following materials were charged into a glass reactor preheated to 130° C.:

(i) 12.8 g (0.0559 mole) of N-(3-allyloxyphenyl)maleimide, and then (ii) 15.76 g (0.0796 mole) of 4,4'-diaminodiphenylmethane.

These were allowed to react for 11 minutes, and then 51.44 g (0.01437 mole) of N,N'-4,4'-diphenylmethanebismaleimide were added over 3 minutes [the ratio $r_1$ was, in this case, equal to 2.51/1 and the number of imide groups contributed by the APM isomer represented 16.3% of the total number of imide groups contributed by the reactants].

The temperature of the reaction mixture was then raised to 150° C. and stirring was continued for 6 minutes, including 4 minutes at a reduced pressure of 400 Pa. A prepolymer was thus obtained, which was molded, cured and tested as indicated in Example 5. The results obtained are reported in Table 5 below.

TABLE 5

| Ageing | Flexural measurements | Test C | Example 5 | Example 6 | Example 7 |
|---|---|---|---|---|---|
| 0 | at 20° C. | Sf 227 MPa | 217 MPa | 248 MPa | 230 MPa |
|  |  | Mf 3116 MPa | 2774 MPa | 2878 MPa | 2994 MPa |
|  | at 250° C. | Sf 93 MPa | 95 MPa | 90 MPa | 90 MPa |
|  |  | Mf 1193 MPa | 1840 MPa | 1717 MPa | 1326 MPa |
| 1000 hr | at 20° C. | Sf 159 MPa | 140 MPa | 137 MPa | 171 MPa |

TABLE 5-continued

| Ageing | Flexural measurements | Test C | Example 5 | Example 6 | Example 7 |
|---|---|---|---|---|---|
| at 250° C. | | Mf 3170 MPa | 3475 MPa | 3440 MPa | 3238 MPa |
| at 250° C. | | Sf 135 MPa | 68.5 MPa | 68 MPa | 100 MPa |
| | | Mf 2480 MPa | 2600 MPa | 2604 MPa | 2462 MPa |

EXAMPLE 8

Several mixtures were prepared, each containing:

(i) 5.22 g (0.0146 mole) of N,N'-4,4'-diphenylmethanebismaleimide, (ii) 1.44 g (0.073 mole) of 4,4'-diaminodiphenylmethane, (iii) 3.34 g (0.0146 mole) of N-(allyloxyphenyl)maleimide isomer, and (iv) 0.05 g (0.5% based on the weight of reactants) of para-toluenesulfonic acid.

[The ratio $r_1$ was, in this case, equal to 4/1 and the number of imide groups contributed by the APM isomer represented 33.3% of the total number of imide groups contributed by the reactants.]

The procedure used was the same as that described above in Example 1.

Results obtained:

TABLE 6

| APM Isomer | Reaction temperature °C. | Reaction time | SP °C. | Free DDM % |
|---|---|---|---|---|
| meta | 170 | 25 min | 85.9 | 0.01 |
| para | 170 | 30 min | 93.2 | 0.002 |

EXAMPLE 9

This is an example of the type described above in Example 4 (see prepolymer):

(i) 1.44 (0.0073 mole) of 4,4'-diaminodiphenylmethane, (ii) 3.34 (0.0146 mole) of N-(3-allyloxyphenyl)maleimide, and (iii) 0.05 g of para-toluenesulfonic acid were reacted in the test tube described in Example 1.

The reaction temperature was 100° C. and the reaction time was 10 minutes. 5.22 g (0.0146 mole) of N,N'-4,4'-diphenylmethanebismaleimide were then added to the prepolymer (P'P') obtained and the reaction mixture was heated to 170° C. and then maintained at this temperature for 63 minutes. [The ratio $r_1$ was, in this case, equal to 4/1 and the number of imide groups contributed by the APM isomer represented 33.3% of the total number of imide groups contributed by the reactants]. The prepolymer (P) obtained was cooled; once solidified, it was ground into powder form.

The softening point was found to be equal to 99.3° C. The residual DDM content was 0.002%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. An imido polymer comprising the polymerizate of:
(a) at least one N,N'-bisimide having the formula:

$$\text{(I)}$$

in which Y is H, $CH_3$ or Cl, A is cyclohexylene, phenylene, 4-methyl-1,3-phenylene, 2-methyl-1,3-phenylene, 5-methyl-1,3-phenylene, 2,5-diethyl-3-methyl-1,4-phenylene, or a radical of the formula:

in which T is a single valency bond or T is a group:

$$-CH_2-; \quad -\underset{\underset{CH_3}{|}}{\overset{\overset{CH_3}{|}}{C}}-; \quad -O-; \quad -\underset{\underset{O}{\|}}{\overset{\overset{O}{\|}}{S}}-; \quad H-\overset{|}{\underset{|}{C}}-\text{phenyl};$$

cyclohexyl; $-O-\text{phenyl}-SO_2-\text{phenyl}-O-$ and X is a hydrogen atom or a methyl, ethyl or isopropyl radical;

(b) at least one diprimary diamine having the formula:

$$H_2N-B-NH_2 \quad \text{(II)}$$

in which B is one of the divalent radicals A, with the proviso that A and B present in the same monomer are identical or different; and (c) at least one copolymerizable unsaturated comonomer having the formula:

$$\text{(III)}$$

in which the allyloxy or methallyloxy radical is in the ortho-, meta- or para-position relative to the benzene ring carbon atom bonded to the nitrogen atom.

2. The imido polymer as defined by claim 1, wherein the amounts of N,N'-bisimide(s) (a), of diamine(s) (b) and of monomer(s) (c) are such that the ratio $r_1$:

$$\frac{\text{total number of moles of bisimide(s) }(a)}{\text{number of moles of diamine(s) }(b)}$$

ranges from 1.2/1 to 10/1, and the number of imide groups contributed by the monomer(s) (c) constitutes up to 50% of the total number of imide groups contributed by the reactants (a)+(c).

3. The cured insoluble polymer produced from the polymerizate defined by claim 1 exhibiting no appreciable softening below the decompositoin temperature.

4. The imido polymer as defined by claim 1, in thermosetting prepolymer state, soluble in polar organic solvents, and having a softening point at a temperature below 200° C.

5. A process for the preparation of the cured imido polymer as defined by claim 3, comprising directly heating of a mixture of (a), (b) and (c) defined by claim 1 at a temperature of from 50° to 250° C.

6. The process as defined by claim 5, comprising first heating said mixture of comonomers to a temperature of from 50° C. to 180° C. to prepolymerize same, and thence curing the resulting prepolymer at a temperature of from 150° C. to 250° C.

7. A process for the preparation of the thermosetting prepolymer as defined by claim 4, comprising directly heating a mixture of (a), (b) and (c) at a temperature of from 50° C. to 180° C. until a homogeneous liquid or pasty product is obtained.

8. The process as defined by claim 7, comprising prepolymerizing said bisimide(s) (a) and diamine(s) (b), and thence heating the resulting prepolymer with the comonomer(s) (c).

9. The process as defined by claim 7, comprising prepolymerizing said diamine(s) (b) and comonomer(s) (c), and thence heating the resulting prepolymer with the bisimide(s) (a).

10. A shaped article comprising the imido polymer as defined by claim 1.

11. A shaped article comprising the imido polymer as defined by claim 3.

12. A shaped article comprising the imido polymer as defined by claim 4.

* * * * *